United States Patent
Lindsay

(10) Patent No.: US 7,463,585 B2
(45) Date of Patent: Dec. 9, 2008

(54) SYSTEM, METHOD, AND APPARATUS FOR LOAD-BALANCING TO A PLURALITY OF PORTS

(75) Inventor: Steven B. Lindsay, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 808 days.

(21) Appl. No.: 10/439,494

(22) Filed: May 16, 2003

(65) Prior Publication Data

US 2004/0008705 A1    Jan. 15, 2004

Related U.S. Application Data

(60) Provisional application No. 60/381,942, filed on May 16, 2002.

(51) Int. Cl.
*H04J 1/16* (2006.01)
*G06F 9/46* (2006.01)
*G06F 15/173* (2006.01)
*G06F 9/34* (2006.01)

(52) U.S. Cl. .................. 370/235; 718/105; 709/243; 711/219

(58) Field of Classification Search ......... 370/401–403, 370/489, 535, 298, 389, 230.1, 282, 388; 718/105

See application file for complete search history.

(56) References Cited

U.S. PATENT DOCUMENTS

| | | | | |
|---|---|---|---|---|
| 4,587,651 | A * | 5/1986 | Nelson et al. | 370/405 |
| 5,701,414 | A * | 12/1997 | Cheng et al. | 340/7.52 |
| 5,754,792 | A * | 5/1998 | Shutoh et al. | 709/243 |
| 5,940,392 | A * | 8/1999 | Lo et al. | 370/392 |
| 6,016,310 | A * | 1/2000 | Muller et al. | 370/255 |
| 6,381,218 | B1 * | 4/2002 | McIntyre et al. | 370/245 |
| 6,434,620 | B1 * | 8/2002 | Boucher et al. | 709/230 |
| 6,577,420 | B1 * | 6/2003 | Ford et al. | 398/194 |
| 6,801,508 | B1 * | 10/2004 | Lim | 370/310.1 |
| 6,836,837 | B2 * | 12/2004 | Taunton et al. | 711/219 |
| 7,010,802 | B1 * | 3/2006 | Bernath et al. | 725/111 |
| 2005/0111364 | A1 * | 5/2005 | Hipp | 370/230 |

* cited by examiner

*Primary Examiner*—Seema S. Rao
*Assistant Examiner*—Xavier Wong
(74) *Attorney, Agent, or Firm*—McAndrews Held & Malloy Ltd.

(57) ABSTRACT

A system, method, and apparatus for load balancing to a plurality of ports is presented herein. A miniport driver is adapted to multiplex and demultiplex traffic workload across the ports. The miniport driver classifies outgoing packet streams and distributes each packet stream to a communication ring, such as an Ethernet ring, for example, associated with at least one of the ports. Additionally, the miniport driver can be configured to configure a operation of the plurality of ports in one of several modes, including a mode wherein the plurality of ports are operable and act as a single logical interface for the operation.

12 Claims, 5 Drawing Sheets

SYSTEM, METHOD, AND APPARATUS FOR LOAD-BALANCING TO A PLURALITY OF PORTS

RELATED APPLICATIONS

This application claims the priority benefit of Provisional U.S. Application Ser. No. 60/381,942, entitled "Turbo Teaming Solution for a Network Adaptor", filed May 16, 2002, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present application is related to computer networks, and more particularly, to a system, method, and apparatus for efficient traffic load-balancing to a plurality of ports.

BACKGROUND OF THE INVENTION

Computers and other devices may be networked together using any one of several available architectures and any one of several corresponding and compatible network protocols. A common network architecture is Ethernet, such as the 10Base-T and 100Base-TX Ethernet Standards according to the IEEE Standard 802.3, although an Ethernet architecture operating at 1 Gigabit per second (Gbps) is also available. In an Ethernet architecture, the computers each include a bus system with corresponding slots for receiving compatible network adapter expansion cards, where one or more of the adapter cards may be network interface cards (NICs).

Each NIC includes an appropriate connector, known as a port, for interfacing a compatible network cable, such as a coaxial cable, a twisted-wire cable, a fiber optic cable, etc. For example, in a star configuration, each NIC includes an RJ-45 connector for receiving a compatible RJ-45 plug of a twisted-wire cable, where each network cable is coupled to a central device such as a repeater, hub, switch, etc.

In a packet-switched configuration, each computer or device sends data packets according to a selected upper level protocol, such as Transmission Control Protocol/Internet Protocol (TCP/IP), the Internet Protocol exchange (IPX), NetBEUI or the like. NetBEUI is short for NetBIOS Enhanced User Interface, and is an enhanced version of the NetBIOS protocol used by network operating systems such as LAN Manager, LAN Server, Windows for Workgroups, Windows 95 and Windows NT. NetBEUI was originally designed by IBM for IBM's LAN Manager server and was later extended by Microsoft and Novell. TCP/IP is used in Internet applications, or in intranet applications such as a local area network (LAN). In this manner, computers and other devices share information according to the higher-level protocols.

One or more of the computers in a network configuration typically operate as a server for other computers and devices in the network. Often, the other computers and devices rely on the server(s) for information, storage, access to databases, programs, other networks, etc., and various other services. It is desired that the client/server connection be as reliable as possible. Where a computer is coupled to a network using a single network controller, if the network controller fails, the access to the server is interrupted.

It is also desired to provide as high a bandwidth client/server connection as possible, especially during periods of heavy demand and increased network traffic. A single network controller results in a bottleneck of data flow. Use of multiple network controllers is especially advantageous for servers. Servers communicate with numerous clients over a network, resulting in more transactions. Additionally, the amount of data transmitted from the server (downloaded) is usually much more than the amount of data transmitted from the client (uploaded).

Balancing the load between the ports is critical to enable communication between the computer and the port, and prevent communication faults. Current devices use intermediate drivers that operate below the computer operating systems and communicate with the miniport drivers. A miniport driver is a driver that interfaces hardware with higher level intermediate drivers. The miniport drivers are used to communicate with the NICs. Known intermediate drivers work well balancing a load across similar (homogeneous) NICs, but have trouble balancing the load between dissimilar NICs.

One currently known intermediate driver operates under the computer operating systems and balances the load between heterogeneous NICs. The intermediate driver operates below and communicates with a network driver interface specification (NDIS) which in turn communicates with two miniport driver instances. Each miniport driver in turn communicates with an NIC.

The foregoing advantageously provides for load balancing across dissimilar NICs. However, additional host overhead is required which affects performance. In some cases, performance efficiency degradation of as much as 50% has been measured when using an intermediate driver to perform load balancing.

Accordingly, it would be advantageous to exploit the advantages of using multiple ports, while minimizing resource overhead and avoiding performance degradation.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system, method, and apparatus for efficient load-balancing for a plurality of ports is presented herein. A miniport driver is adapted to multiplex and demultiplex traffic workload across the ports. The miniport driver classifies outgoing packet streams and distributes each packet stream to a communication ring, such as an Ethernet ring, for example, associated with at least one of the ports.

In one embodiment, the NIC is optionally configured so that the NIC appears to the computer operating system to be a single peripheral control interface (PCI) function containing two PCI base address registers, one for each port. Both ports share a single interrupt line.

In another embodiment, the NIC can be configured in one of a plurality of modes, including modes where each of the ports are separately operable, and a mode wherein the plurality of ports are operable as a single logical PCI function from the perspective of an operating system.

These and other advantages and novel features of the present invention, as well as details of an illustrated embodiment thereof, will be more fully understood from the following description and drawings.

DETAILED DESCRIPTION OF THE INVENTION

Figure 1:
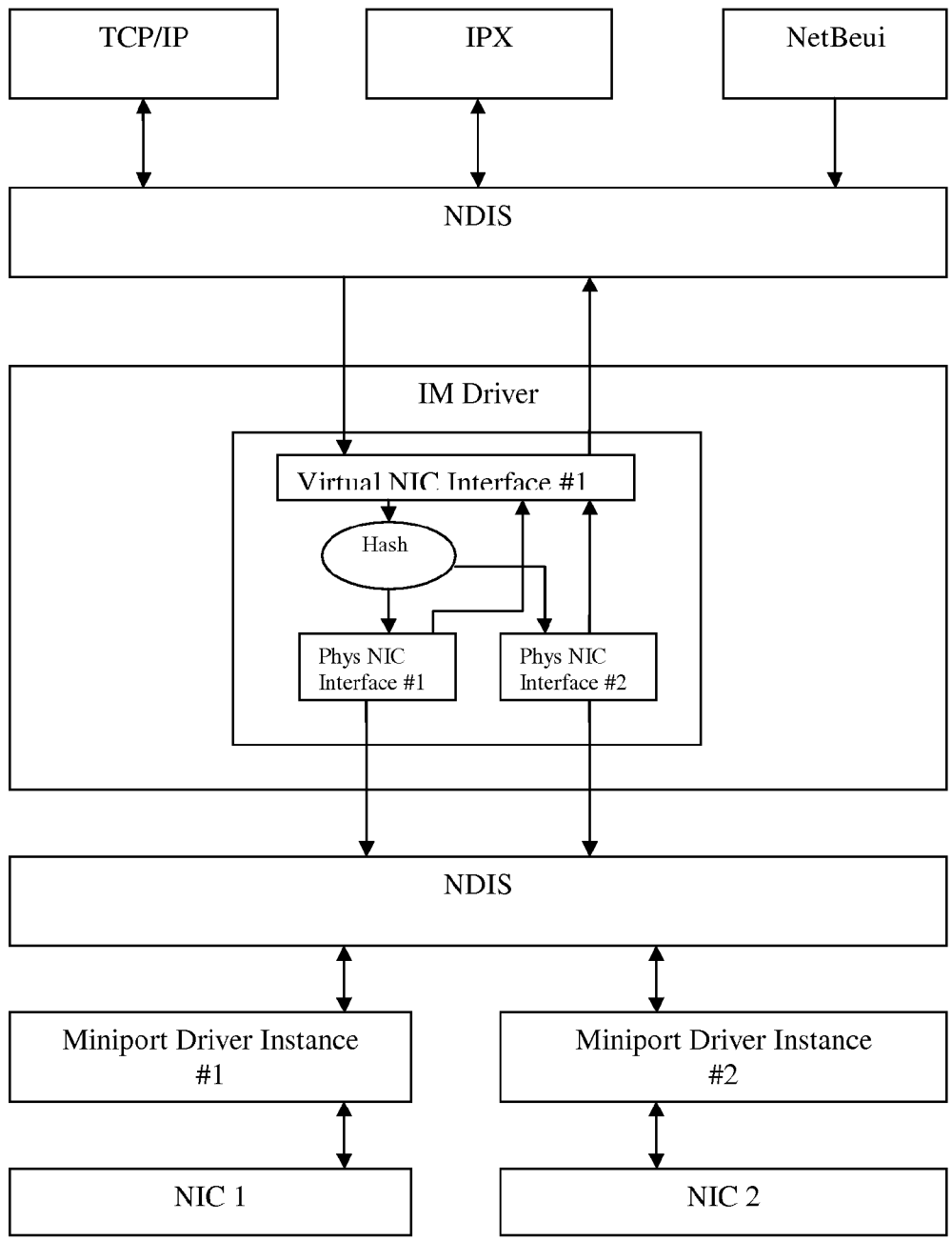
FIG. 1 is a block diagram of an intermediate driver based load balancing solution.

Referring now to FIG. 1, there is illustrated a block diagram of an intermediate driver based load balancing solution. A computer system is controlled by an operating system that supports one or more communication protocols, such as Transmission Control Protocol/Internet Protocol, TCP/IP, Internet Protocol Exchange, IPX, or Network Basic Input Output System End User Interface, NetBEUI. Network access is provided by network interface cards (NIC), NIC1, NIC2.

A Network Device Interface Specification, NDIS, interfaces the TCP/IP, IPX, and NetBEUI to the NICs, NIC1, NIC2. The NDIS communicates with two miniport driver instances, Miniport Driver Instance #1, Miniport Driver Instance #2, that in turn communicate with the NICs, NIC1, NIC2, respectively. An intermediate driver, IM Driver comprising a Virtual NIC interface, a hashing module, and physical NIC interfaces, Phys NIC Interface #1, Phys NIC interface #2, operating below the operating system performs the load balancing across the NICs, NIC1, NIC2.

However, the intermediate driver solution injects additional host overhead that hurts performance. The performance penalty due to the intermediate driver heavily depends on the specific test/benchmark scenario. In some cases, performance efficiency degradation of as much as 50% can be incurred when using an intermediate driver to perform load balancing in a Microsoft Windows (registered trademark) environment.

Figure 2:
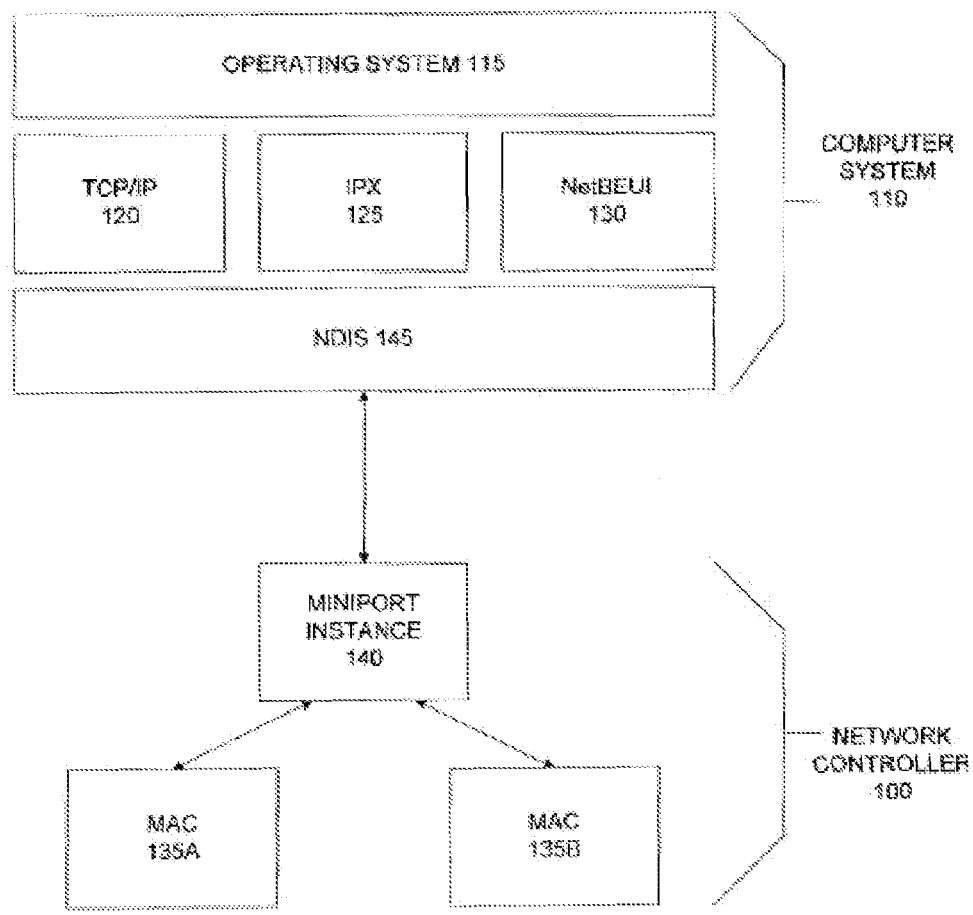
FIG. 2 is a block diagram of a miniport driver configured to balance traffic between a plurality of ports in accordance with an embodiment of the present invention.

Referring now to FIG. 2, there is illustrated a block diagram of a dual-port network controller 100 for providing access to a network 105 for a computer system 110, in accordance with an embodiment of the present invention. The network 105 can comprise, for example, a network with a 10 Gigabit Ethernet architecture according to IEEE Standard 802.3. The computer system 110 can comprise either a client or a server.

The computer system 110 is controlled by an operating system 115. The operating system 115 supports one or more communication protocols, such as Transmission Control Protocol/Internet Protocol (TCP/IP) 120, Internet Protocol Exchange (IPX) 125, or Network Basic Input Output System End User Interface (NetBEUI) 130.

The dual-port network controller 100 comprises a two media access controllers 135a, 135b for communicating with the network 105. Use of the two media access controllers 135a, 135b provides for reliable network access. Additionally, the two media access controllers 135a, 135b alleviate bottlenecking when large amounts of data are transmitted between the computer system 110 and the network 105, especially when the computer system 110 comprises a server.

The dual-port network controller 100 also includes a miniport driver 140 for load balancing between the MACs 135a, 135b. The miniport driver 140 is homogeneous software that classifies and distributes outgoing packet streams. A single instance of a miniport driver 140 multiplexes and demultiplexes traffic across both MACs 135a, 135b.

The computer system 110 and the dual-port network controller 100 are interfaced by a Network Driver Interface Specification (NDIS) 145. As noted above, the miniport driver 140 performs the load balancing across the MACs 135a, 135b. The foregoing avoids the extra overhead associated with placement of an intermediate driver at the NDIS 145.

Figure 3:
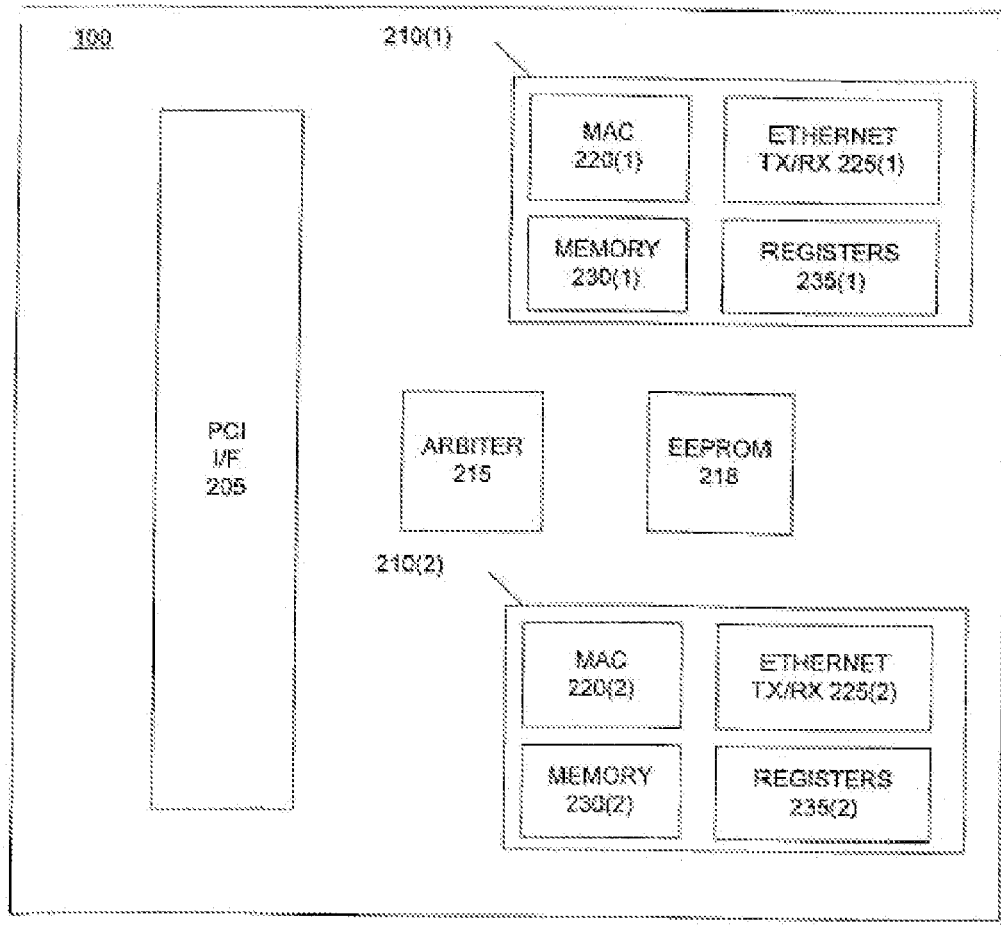
FIG. 3 is a block diagram of a dual port network controller in accordance with an embodiment of the present invention.

Referring now to FIG. 3, there is illustrated a block diagram of an exemplary dual-port network controller 100 in accordance with an embodiment of the present invention. The dual-port network controller 100 includes a PCI bus interface 205 and two PCI function modules 210(1), 210(2). The PCI bus interface 205 provides interrupts, INTA and INTB. An arbiter 215 arbitrates contention over the PCI bus interface 205 between the PCI function modules 210. The dual-port network controller 100 also includes an EEPROM 218 for storage of a mode of operation code.

Each PCI function includes a MAC 220 associated with an ethernet transceiver 225. The MAC 220 performs the data link layer function for data transmitted over the network while the ethernet transceiver 225 performs the physical layer function. Each MAC 220 is also associated with a memory 230 and registers 235. The memory 230 provides packet buffering for higher performance and load balancing. The registers 235 include various PCI space configuration registers including a base address registers 235a.

The network controller can operate in one of several modes. The modes include modes wherein only MAC 220(1) is operating and where only MAC 220(2) is operating, and where both MACs 220 are operating and appear to the operating system 115 as separate PCI functions. In each of the foregoing modes, each PCI module 210(1), 210(2) are associated with an interrupt, INTA, and INTB, respectively.

There is also a mode of operating, wherein both MACs 220 are operating and appear to the operating system 115 as a single PCI function. In the mode wherein both MACs 220 are operating and appear to the operating system 115 as a single PCI function, both MACs 220 use INTA to interrupt the operating system 115.

As can be seen, there is a two modes of operation where both MACs 220 operate. In one mode, the MACs 220 appear as 2 PCI functions, while in another mode, the MACs 220 appear as a single PCI function. The advantage of a single function is that it appears to be only a single device to the OS, rather than multiple devices. This makes the configuration and management more intuitive.

The specific mode of operation can be selectively set by storage of a specific code in the EEPROM 218. During reset, the EEPROM 218 is read by the miniport driver 140, which configures the network controller 100. An exemplary coding scheme is shown in TABLE 1.

TABLE 1

| Code | Operation Mode |
|------|----------------|
| 00 | Both operable, two PCI functions |
| 01 | MAC(1) operable |
| 10 | MAC(2) operable |
| 11 | Both operable, single PCI function |

Figure 4:
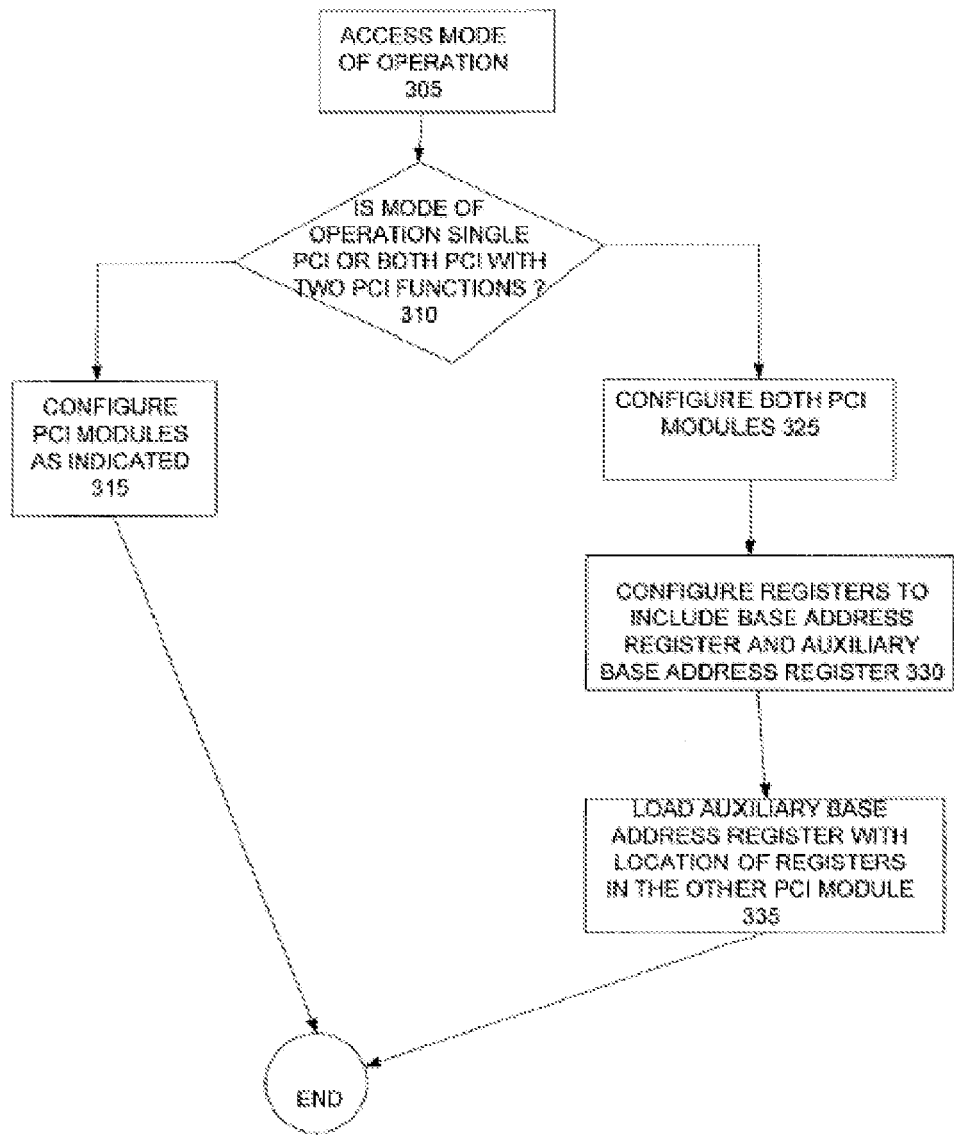
FIG. 4 is a flow chart describing the operation of a miniport driver in accordance with an embodiment of the present invention.

Referring now to FIG. 4, there is illustrated a flow diagram describing the operation of the miniport driver in accordance with an embodiment of the present invention. Responsive to a reset, the operating system 115 loads the miniport driver 140. During an initialization sequence, the miniport driver 140 accesses (305) the mode of operation code in the EEPROM 218. The miniport driver 140 configures the network controller 100 based on the mode of operation code (310).

If the mode of operation code during 310 indicates either PCI module 210(1) operable only, PCI module 210(2) operable only, or both PCI modules operable, with two PCI functions, the miniport driver 140 configures (315) PCI module 210(1), and/or PCI module 210(2) as indicated by the mode of operation code. Each operable PCI module 210 is associated with a particular PCI function identification number. After configuration of the PCI modules 210, each operable PCI module 210 is associated (320) with a separate miniport driver instance 140.

If the mode of operation code during 310 indicates that both PCI modules 210(1), 210(2) are to operate, with one PCI function, the miniport driver 140 configures (325) the PCI modules 210. The registers 235(1) of PCI module 210 are configured (330) to include a base address register 235(1)$a$, and an auxiliary base address register 235(1)$a'$. The auxiliary base address register 235(1)$a'$ is loaded (335) with the location of the registers 235(2) of PCI module 210(2). After configuration, a single instance of miniport driver 140 performs load balancing across both MACs 220 as shown in FIG. 1.

Figure 5:
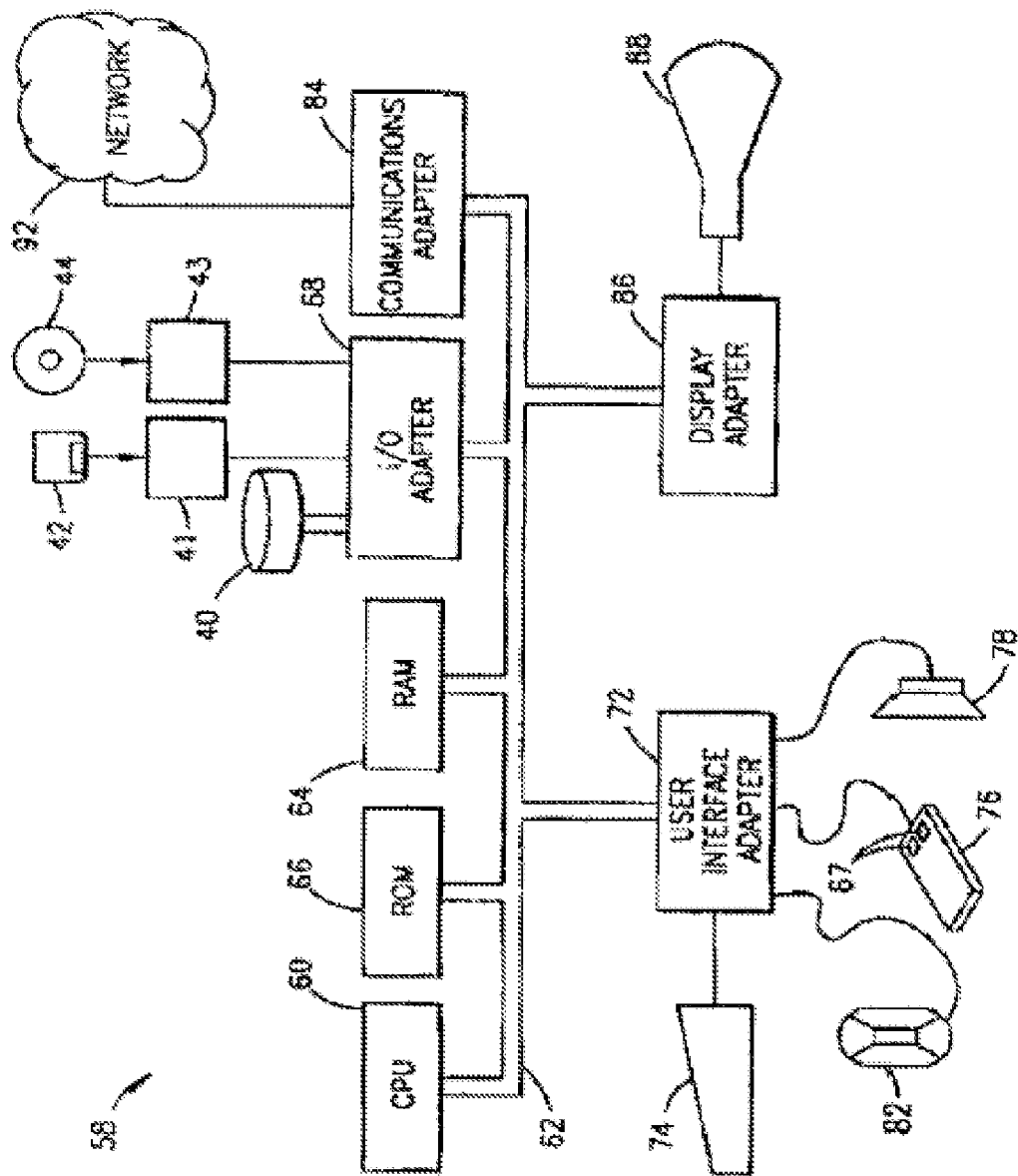
FIG. 5 is a block diagram of an exemplary computer system in accordance with an embodiment of the present invention.

Referring now to FIG. 5, there is illustrated an exemplary computer system 110 in accordance with an embodiment of the present invention. A CPU 60 is interconnected via system bus 62 to random access memory (RAM) 64, read only memory (ROM) 66, an input/output (I/O) adapter 68, a user interface adapter 72, a communications adapter 84, and a display adapter 86. The input/output (I/O) adapter 68 connects peripheral devices such as hard disc drives 40, floppy disc drives 41 for reading removable floppy discs 42, and optical disc drives 43 for reading removable optical disc 44 (such as a compact disc or a digital versatile disc) to the bus 62. The user interface adapter 72 connects devices such as a keyboard 74, a mouse 76 having a plurality of buttons 67, a speaker 78, a microphone 82, and/or other user interfaces devices such as a touch screen device (not shown) to the bus 62. The communications adapter 84 connects the computer system to a data processing network 92. The display adapter 86 connects a monitor 88 to the bus 62.

An embodiment of the present invention can be implemented as sets of instructions resident in the random access memory 64 of one or more computer systems 110 configured generally as described in FIG. 4. Until required by the computer system 58, the set of instructions may be stored in another computer readable memory, for example in a hard disc drive 40, or in removable memory such as an optical disc 44 for eventual use in an optical disc drive 43, or a floppy disc 42 for eventual use in a floppy disc drive 41. One skilled in the art would appreciate that the physical storage of the sets of instructions physically changes the medium upon which it is stored electrically, magnetically, or chemically so that the medium carries computer readable information.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for configuring a plurality of ports, said method comprising:
   detecting a predetermined mode of operation, wherein the predetermined mode of operation is selected from a group comprising:
     a single port operation mode, wherein one of the plurality of ports is operable;
     a multiple port operation mode, wherein the plurality of ports are operable, and wherein each of the ports are associated with a separated Peripheral Component Interconnect (PCI) function; and
     a multiple port operation mode, wherein each of the plurality of ports are operable and wherein each of the plurality of ports is associated with a single Peripheral Component Interconnect (PCI) function; and
   if the single port operation mode is detected, configuring the one of the plurality of ports; and
   if the multiple port operation mode is detected:
     configuring the plurality of ports; and
     configuring a register in a register set associated with one of the plurality of ports to store the address of a register set associated with another port.

2. The method of claim 1, further comprising:
   writing one instance of a miniport driver;
   balancing a traffic load between the plurality of ports by the miniport driver.

3. The method of claim 2, wherein balancing the traffic load further comprises:
   multiplexing and demultiplexing the traffic load.

4. The method of claim 2, wherein balancing the traffic load further comprises:
   classifying outgoing packet streams; and
   distribute outgoing packet streams to a communication ring associated with at least one of said ports.

5. An article of manufacture comprising a computer readable medium, said computer readable medium further comprising a plurality of executable instructions for configuring a plurality of ports, wherein said instructions comprise:
   detecting a predetermined mode of operation, wherein the predetermine mode of operation is selected from a group consisting of:
     a single port operation mode, wherein one of the plurality of ports is operational;
     a multiple port operation mode, wherein the plurality of ports are operable, and wherein each of the ports are associated with a separated Peripheral Component Interconnect (PCI) function; and
     a multiple port operation mode, wherein each of the plurality of ports are operable and wherein each of the plurality of ports is associated with a single Peripheral Component Interconnect (PCI) function; and
   if the single port operation mode is detected, configuring the one of the plurality of ports; and
   if the multiple port operation mode is detected:
     configuring the plurality of ports; and
     configuring a register in a register set associated with one of the plurality of ports to store the address of a register set associated with another port.

6. The article of manufacture of claim 5, wherein the plurality of instructions further comprise:
  writing one instance of a miniport driver;
  balancing a traffic load between the plurality of ports by the miniport driver.

7. The article of manufacture of claim 6, wherein balancing the traffic load further comprises:
  multiplexing and demultiplexing the traffic load.

8. The article of manufacture of claim 6, wherein balancing the traffic load further comprises:
  classifying outgoing packet streams; and
  distributing the outgoing packet streams to a communication ring associated with at least one of said ports.

9. The article of manufacture of claim 6, wherein balancing the traffic load comprises balancing the traffic load for an integrated gigabit controller.

10. The article of manufacture of claim 5, further comprising:
  a processor connected to the computer readable medium, wherein the processor executes the plurality of instructions.

11. The article of manufacture of claim 9, further comprising a bus connected to the processor, and wherein the plurality of ports are connected to the bus.

12. The article of manufacture of claim 10, further comprising:
  a plurality of ethernet transceivers, wherein each of the plurality of ethernet transceivers are connected to a particular one of the plurality of ports.

* * * * *